A. E. BERG.
TIRE SLEEVE.
APPLICATION FILED DEC. 1, 1909.
982,465.
Patented Jan. 24, 1911.
2 SHEETS—SHEET 1.
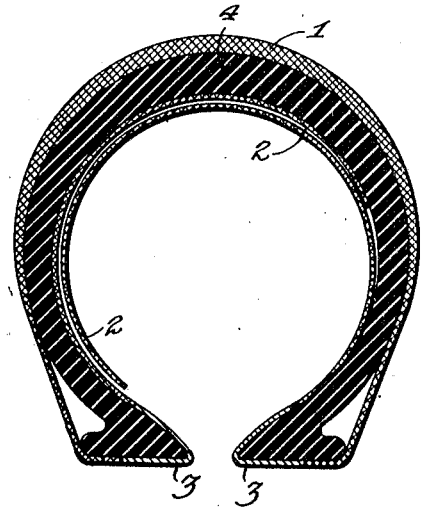
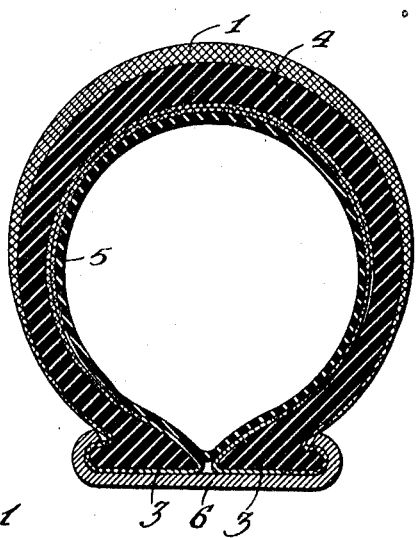
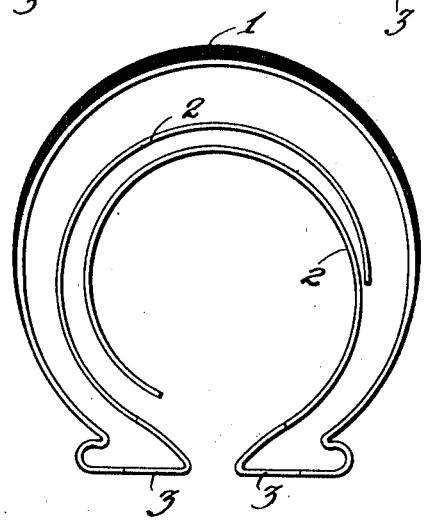
Witnesses
Frank H. Carter
H. C. Schroeder
Inventor
Augustine E Berg
By E. E. Vrooman,
Attorney.

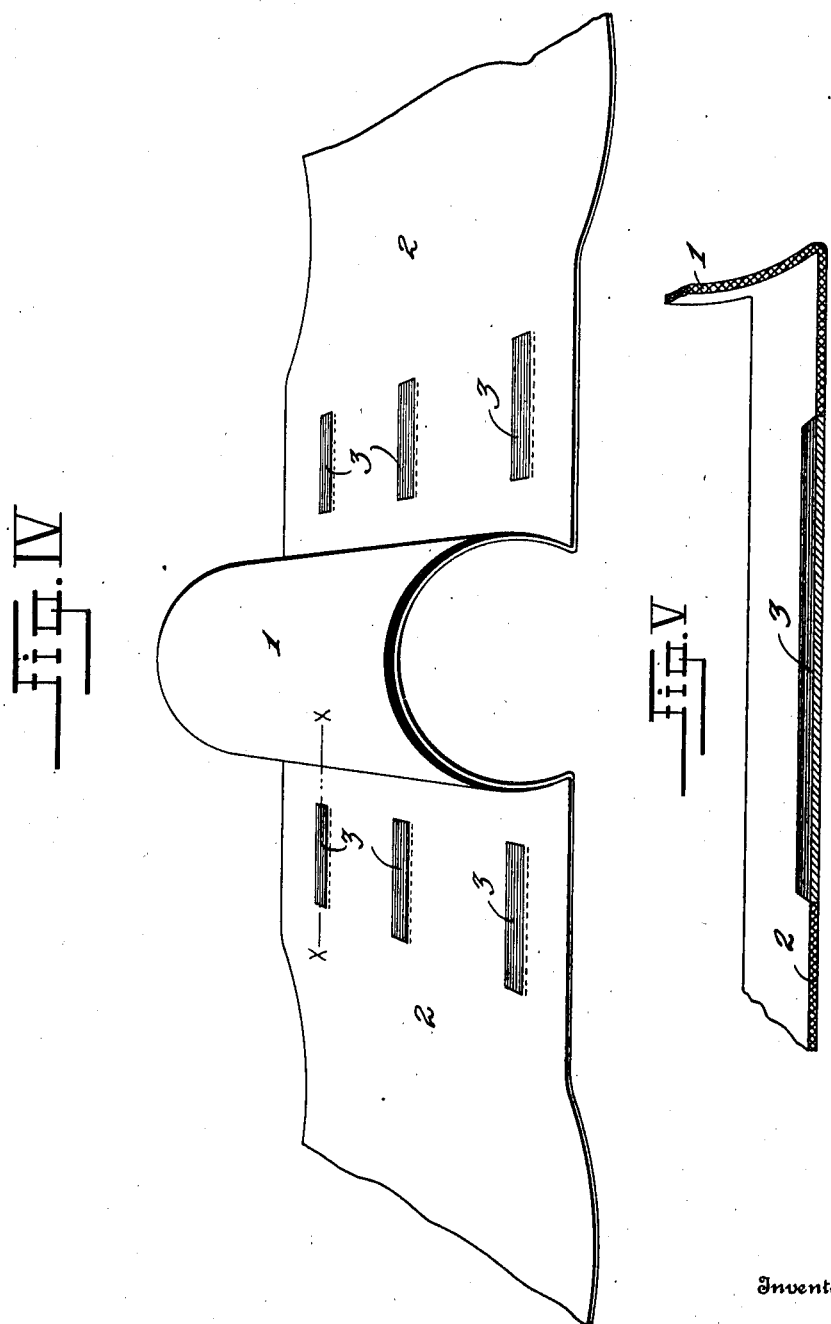

UNITED STATES PATENT OFFICE.

AUGUSTINE E. BERG, OF OAKLAND, CALIFORNIA.

TIRE-SLEEVE.

982,465.

Specification of Letters Patent.   Patented Jan. 24, 1911.

Application filed December 1, 1909.   Serial No. 530,746.

*To all whom it may concern:*

Be it known that I, AUGUSTINE E. BERG, citizen of the United States, residing at Oakland, in the county of Alameda and State of California, have invented certain new and useful Improvements in Tire-Sleeves, of which the following is a specification.

This invention relates to the subject of tire protectors, and the principal object of the same is to provide a shield or shoe that may be wrapped about the outer tube of a tire to close punctures or ruptures therein, said shield being adapted to surround the outer and the inner portion of the inner tube with its ends arranged in overlapping relation within said tube and adapted to be clamped therein by the expansion of the inner tube of the tire, reinforcement being provided in said shield at the points which contact with the base of the tire so that the wear caused by the pressure between the base of the tire and the usual tire rim will not injure said shield.

In carrying out the objects of the invention generally stated above it will be understood, of course, that the essential features thereof are necessarily susceptible of changes in details and structural arrangements, a preferred and practical embodiment of which is shown in the accompanying drawings, wherein:—

Figure I is a transverse vertical sectional view of the outer tube of a tire showing the same inclosed by the improved shield. Fig. II is a similar view of the tire being mounted in a rim and the inner tube thereof being in position and inflated. Fig. III is a diagrammatic end view of the improved shield. Fig. IV is a detail fragmentary view of the improved shield shown in a spread out condition. Fig. V is an enlarged fragmentary sectional view taken on the line X—X, Fig. IV.

Referring to said drawings and more particularly to Figs. III—IV thereof it will be seen that the shield comprises primarily a semi-spherical central portion 1 that is shaped to conform to the external contour of a tire, said central portion having its tread portion thickened. A side flap 2 projects from each longitudinal edge of said central portion 1, said flaps each having regularly spaced apart resilient metallic strips 3 embedded therein.

In applying the improved shield in protecting position about a damaged tube the central portion 1 is fitted over the outer tube 4, the end flaps placed within the tube in overlapping relation as is shown in Figs. I, II and III of the accompanying drawings, the reinforcing strips bent around the base of the tube in a substantially hooked shape so that they will not only prevent wear upon the shield at these points but will also prevent the shield creeping, relative to said tube. The inner tube 5 is then placed within the outer tube, and the tire is then fitted within the rim 6 in the usual manner. The inner tube is then inflated in the usual manner which expands the outer tube and clamps the overlapped flaps within the outer tube as is shown in Fig. II of the accompanying drawings.

It will be seen from the foregoing that the improved shield may be readily applied to a damaged tube by simply removing the same from its rim, after which by inflating the inner tube the same is held firmly about the outer tube so that said tube will be thoroughly protected thereby.

What I claim as my invention is:—

A tire shield comprising a central portion adapted to be fitted over the outer surface of a tire, flaps extending from the longitudinal edges thereof and adapted to be arranged in overlapping relation within said tire, flexible metallic strips carried by said flaps and arranged in parallel spaced relation adjacent to said central portion, and adapted to be bent about the base of said tire and to grip it tightly to prevent movement of said shield with relation to said tire.

In testimony whereof I affix my signature in presence of two witnesses.

AUGUSTINE E. BERG.

Witnesses:
H. C. SCHROEDER,
F. P. SCHROEDER.